United States Patent
Trong et al.

(10) Patent No.: US 7,461,117 B2
(45) Date of Patent: Dec. 2, 2008

(54) FLOATING POINT UNIT WITH FUSED MULTIPLY ADD AND METHOD FOR CALCULATING A RESULT WITH A FLOATING POINT UNIT

(75) Inventors: Son Dao Trong, Stuttgart (DE); Juergen Haess, Schoenaich (DE); Christian Jacobi, Boeblingen (DE); Klaus Michael Kroener, Boeblingen (DE); Silvia Melitta Mueller, Altdorf (DE); Jochen Preiss, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 11/055,812

(22) Filed: Feb. 11, 2005

(65) Prior Publication Data

US 2006/0184601 A1    Aug. 17, 2006

(51) Int. Cl.
G06F 7/483    (2006.01)
(52) U.S. Cl. ..................................... 708/501
(58) Field of Classification Search ................. 708/501
See application file for complete search history.

(56) References Cited

U.S. PATENT DOCUMENTS

| | | | | |
|---|---|---|---|---|
| 4,969,118 A | * | 11/1990 | Montoye et al. | 708/501 |
| 5,796,644 A | * | 8/1998 | Jiang | 708/501 |
| 6,779,008 B1 | * | 8/2004 | Erle et al. | 708/211 |
| 6,801,924 B1 | * | 10/2004 | Green et al. | 708/495 |
| 7,113,969 B1 | * | 9/2006 | Green et al. | 708/495 |
| 2002/0194240 A1 | * | 12/2002 | Pangal et al. | 708/501 |
| 2004/0225703 A1 | * | 11/2004 | Pangal | 708/498 |

* cited by examiner

Primary Examiner—David H Malzahn
(74) Attorney, Agent, or Firm—Hamilton & Terrile, LLP; Stephen A. Terrile

(57) ABSTRACT

The invention proposes a Floating Point Unit (1) with fused multiply add, with one addend operand (eb, fb) and two multiplicand operands (ea, fa; ec, fc), with a shift amount logic (2) which based on the exponents of the operands (ea, eb and ec) computes an alignment shift amount, with an alignment logic (3) which uses the alignment shift amount to align the fraction (fb) of the addend operand, with a multiply logic (4) which multiplies the fractions of the multiplicand operands (fa, fc), with a adder logic (5) which adds the outputs of the alignment logic (3) and the multiply logic (4), with a normalization logic (6) which normalizes the output of the adder logic (5), which is characterized in that a leading zero logic (7) is provided which computes the number of leading zeros of the fraction of the addend operand (fb), and that a compare logic (8) is provided which based on the number of leading zeros and the alignment shift amount computes select signals that indicate whether the most significant bits of the alignment logic (3) output have all the same value in order to: a) control the carry logic of the adder logic (5) and/or b) control a stage of the normalization logic (6).

1 Claim, 3 Drawing Sheets

FLOATING POINT UNIT WITH FUSED MULTIPLY ADD AND METHOD FOR CALCULATING A RESULT WITH A FLOATING POINT UNIT

TECHNICAL FIELD OF THE INVENTION

The present invention relates to a Floating Point Unit with fused multiply add, which is able of handling denormal multiplicand and addend operands in the regular data flow, according to claim 1. Further the invention relates to a method for calculating a result with a Floating Point Unit with fused multiply add, which is able of handling denormal multiplicand and addend operands in the regular data flow, according to claim 1.

BACKGROUND OF THE INVENTION

Contemporary fused-multiply-add Floating Point Units usually comprise an incrementer and an end-around-carry adder whose outputs are fed into a normalization shifter. In high frequency floating point units, these parts are often timing critical. This is partly due to the need for feeding the carry-out of the incrementer into the end-around-carry input of the adder in the prior art. This is necessary since during subtraction the incrementer input may be equal to "1 . . . 1" although the addend's exponent is larger than the product exponent, which usually cannot happen, i.e. in the absence of denormal numbers.

In prior art this situation is detected by checking the incrementer input for being equal to "1 . . . 1", and if so activating the end-around-carry logic in the adder. Due to circuit speed and also due to physical distances of the components this becomes a more and more timing critical path. Also, since the all-1-detection finishes only shortly before the final incrementer and adder-output are available, the selection of the normalization shift amount becomes critical since it depends on the all-1-detection (compare FIG. 1).

The purpose of the invention is to develop a Floating Point Unit with fused multiply add, which is able of handling denormal multiplicand and addend operands in the regular data flow that can overcome the timing critical design by a sophisticated new method and design of a Floating Point Unit.

SUMMARY OF THE INVENTION

The first part of the invention's technical purpose is met by the proposed Floating Point Unit with fused multiply add, which is able of handling denormal multiplicand and addend operands in the regular data flow, with one addend operand and two multiplicand operands, with a shift amount logic which based on the exponents of the operands computes an alignment shift amount, with an alignment logic which uses the alignment shift amount to align the fraction of the addend operand, with a multiply logic which multiplies the fractions of the multiplicand operands, with an adder logic which adds the outputs of the alignment logic and the multiply logic, with a normalization logic which normalizes the output of the adder logic, that is characterized in that a leading zero logic is provided which computes the number of leading zeros of the fraction of the addend operand, and that a compare logic is provided which based on the number of leading zeros and the alignment shift amount computes select signals that indicate whether the most significant bits of the alignment logic output have all the same value in order to:
 a) control the carry logic of the adder logic and/or
 b) control a stage of the normalization logic.

The invention solves the described timing problem by early detecting whether the most significant bits of the alignment logic output have all the same value. This information can be used to simplify the carry logic of the adder logic and to reduce the delay of the control signals of the first stage of the normalization logic.

In a preferred embodiment of the invention said adder logic is divided in an adder unit and an incrementer unit, the output of the alignment logic is divided in a lower part and a higher part, the lower part is added by the adder unit to the product of the multiplier logic, the incrementer unit adds a carry-out of the adder unit to the higher part of the output of the alignment logic.

Preferably the select signals of the compare logic indicate whether all bits of the higher part of the alignment logic output have the same value.

In a preferred embodiment of the invention, the carry output of the adder logic is computed using the select signals of the compare logic and the carry output of the adder unit.

In this way the incrementer unit of the adder logic can be decoupled from the adder unit. This removes the incrementer-carry-out from the critical path of the Floating Point Unit.

The adder unit includes an end-around-carry logic and this end-around-carry logic can be activated by the select signals of the compare logic.

This reduces the delay of the end-around-carry logic as it does not need to take into account the inputs of the incrementer unit.

In another preferred embodiment of the invention, the adder logic output is divided into a lower and a higher part, where the higher part is computed by the incrementer unit and where the lower part is computed by the adder unit, and the select signals of the compare logic are used to shift out the higher part of the adder logic output in the normalization shifter.

This may reduce the delay of the first stage of the normalization logic since the control signal to shift out the higher part of the adder logic output is computed earlier.

Another feature of the invention is a method for calculating a result with a Floating Point Unit with fused multiply add, which is able of handling denormal multiplicand and addend operands in the regular data flow, with one addend operand and two multiplicand operands, wherein an alignment shift amount based on the exponents of the operands is computed by a shift amount logic, wherein the fraction of the addend operand is aligned according to the alignment shift amount by an alignment logic, wherein the fractions of the multiplicand operands are multiplied by a multiply logic, wherein the outputs of the alignment logic and the multiply logic are added by a adder logic, wherein the output of the adder logic is normalized by a normalization logic, which is characterized in the following steps:
 calculating the number of leading zeros of the fraction of the addend operand by a leading zero logic,
 computing select signals by a compare logic based on the number of leading zeros and the alignment shift amount, which select signals indicate whether the most significant bits of the alignment logic output have all the same value in order to:
  a) control the carry logic of the adder logic and/or
  b) control a stage of the normalization logic.

The output of the alignment logic can be divided in a lower part and a higher part, respectively the adder logic can be divided in an adder unit and an incrementer unit. The lower part can be added accordingly by the adder unit to the product of the multiplier logic and the incrementer unit adds a carry-out of the adder unit to the higher part of the output of the alignment logic.

In a preferred embodiment of the invention, the select signals of the compare logic indicate whether all bits of the higher part of the alignment logic output have the same value.

In another preferred embodiment of the invention, the carry output of the adder logic is computed using the select signals of the compare logic and the carry output of the adder unit.

Preferably the adder unit will include an end-around-carry logic which is activated by the select signals of the compare logic.

In a preferred embodiment of the invention, the adder logic output is divided into a lower and a higher part, which higher part is computed by the incrementer unit and which lower part is computed by the adder unit, and said select signals of the compare logic are used to shift out the higher part of the adder logic output in the normalization shifter.

The foregoing, together with other objects, features, and advantages of this invention can be better appreciated with reference to the following specification, claims and drawings.

DETAILED DESCRIPTION OF THE PREFERRED EMBODIMENTS

Equal reference signs in the description designate the same or equivalent elements.

Figure 1:
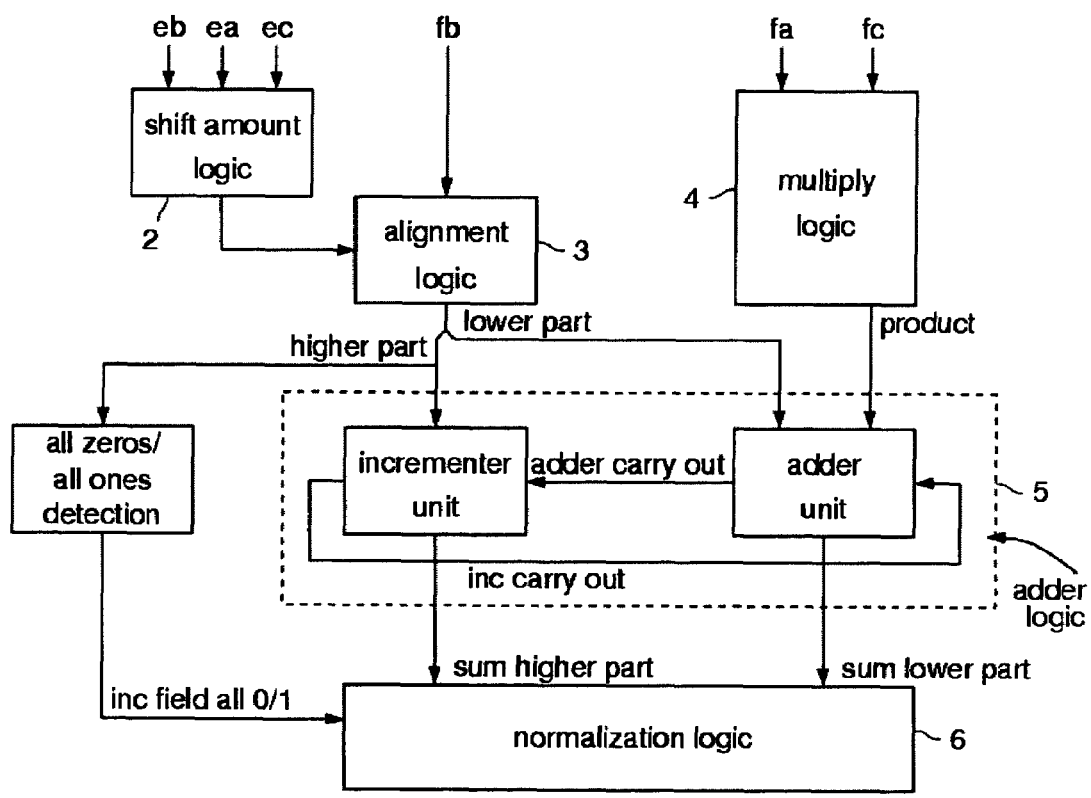
FIG. 1 shows a scheme of a state-of-the-art Floating Point Unit.

FIG. 1 depicts a scheme of a state-of-the-art Floating Point Unit that support fused multiply add instructions compute A*C+B for three floating point numbers A, B, and C.

A floating point number X consists of a sign sx, an exponent ex and a fraction fx ($0<=fx<2$) such that $X=(-1)^{sx}*2^{ex}*fx$. (For the sake of description we also assume that e is the unbiased exponent value, raised by 1 if x is denormal, as demanded by the IEEE 754 floating-point standard). The number X is called normal if ex>=e_min, the minimum exponent, and $1<=fx<2$; if ex=e_min and $0<fx<1$, then X is called denormal.

Figure 2:
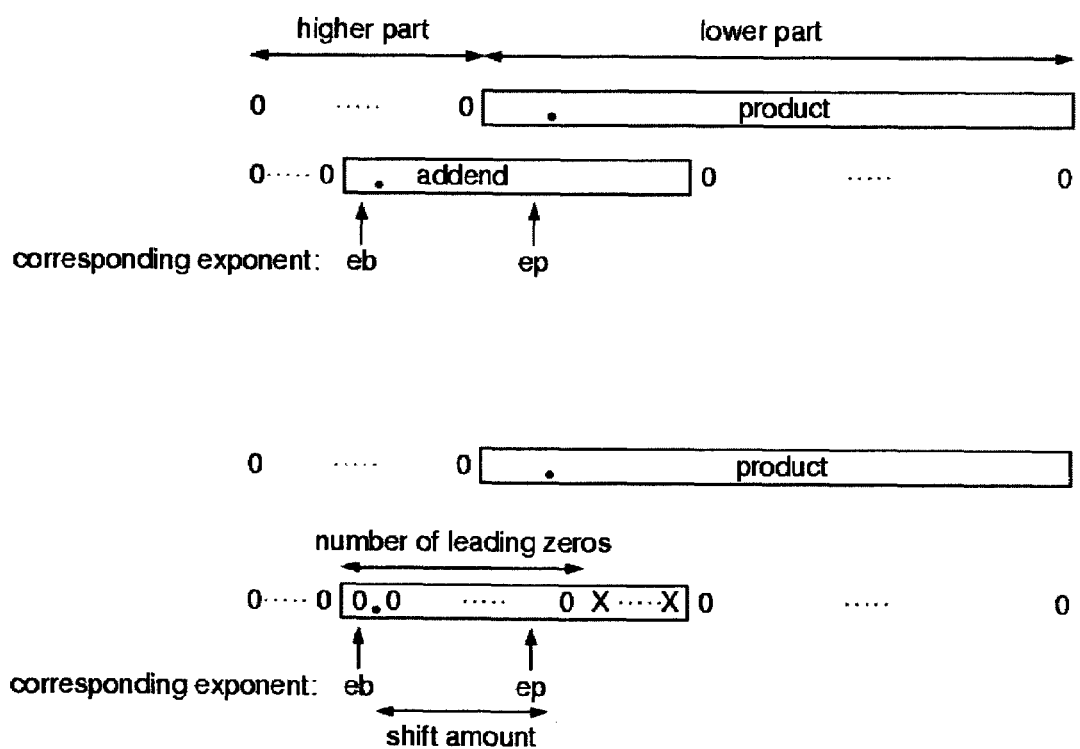
FIG. 2 shows the type of computing of Floating Point Units with fused multiply add.

For the sake of the description we assume that the exponent eb of the addend B is larger than the exponent ep=ea+ec of the product A*C. In order to add A*C and B the fraction of the addend B must be aligned to the fraction of the product A*C such that the bits of the fractions are of the same order of magnitude. E.g., if eb=ea+ec+5, the addend fraction fb must be aligned such that the bit 4 of fb aligns to the most significant bit (bit 0) of the product fraction fp=fa*fc (Note that $0<=fp<4$, thus fp has two digits before the binary point.) The product is padded with zeros (see FIG. 2). Then the fractions can be added using standard integer arithmetic. This means that the aligned addend and the product have a relation as depicted in FIG. 2.

The aligned addend fraction can be divided into a higher part and a lower part, such that the product fraction has only zeros in the higher part. This simplifies the computation of the sum of aligned addend fraction and product fraction since for the higher part only an incrementer is needed. An adder is used to add the lower part of the aligned addend fraction and the product fraction.

If the addend is denormal, then the left side of the addend contains zeros, and this field of zeros may extend into the product range; this means that although the addend exponent is larger than the product exponent, the addend value might be smaller than the product value. This is depicted at the bottom of FIG. 2.

If the signs of addend B and product P=A*C differ, the operation is an effective subtraction. Since the fraction of the result must be positive, the Floating Point Unit must compute the absolute value of the difference of the fractions. This is usually done using an end-around-carry adder. This adder uses the carry out of the addition in order to decide whether the difference is positive or negative and returns either A-P or P-A depending of the carry out.

In prior art the computation of the this carry out took the whole range of bits into account, i.e. the higher and the lower part, which can be up to about 3*53=159 bits for double precision floating point numbers. For this it had to be checked if the input of the incrementer consists of all '1's by AND-ing all bits. This AND-tree is often timing critical and is removed from the critical path by this invention.

In case of an effective subtraction the input of the incrementer is the negated higher part of the aligned addend fraction. Thus, if no '1' of the addend fraction sticks into the higher part, the input of the incrementer consists of all '1's.

If the floating point unit does not support denormal inputs, the check whether a '1' of the addend fraction fb sticks into the higher part can be done by simply checking the shift amount eb-ep, since the situation depicted in FIG. 2 cannot happen (the addend always starts with a 1). This has already been done in prior art. For denormal inputs this check is not sufficient since the addend fraction fb may start with 0s. The invention extends this check for denormal inputs by taking the number of leading zeros of fb into account.

Figure 3:
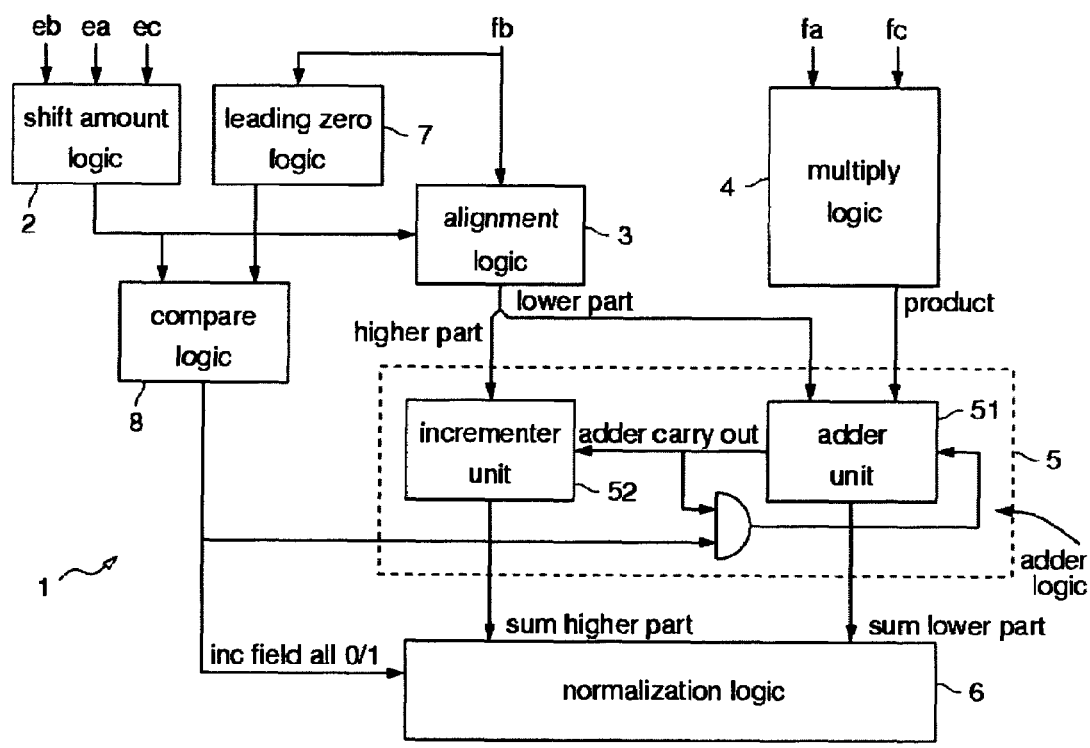
FIG. 3 shows a scheme of a Floating Point Units with fused multiply add according to the invention.

FIG. 3 shows a scheme of a Floating Point Unit that support fused multiply add instructions according to the invention, which is able of handling denormal multiplicand and addend operands in the regular data flow.

The Floating Point Unit 1 has inputs for an addend operand (eb, fb) and two multiplicand operands (ea, fa; ec, fc), which are divided into exponents ea, eb and ec and fractions fa, fb and fc. In order to simplify the description the signs sa, sb, and sc are omitted.

The exponents of the operands ea, eb and ec are processed in a shift amount logic 2 which based on the exponents computes an alignment shift amount. This alignment shift amount is fed in an alignment logic 3 which uses the alignment shift amount to align the fraction fb of the addend operand.

A multiply logic 4 multiplies the fractions fa and fc of the multiplicand operands.

The outputs of the alignment logic 3 and the multiply logic 4 are fed in an adder logic 5 which adds the named outputs.

The output of the adder logic 5 is put in a normalization logic 6 which normalizes the output of the adder logic 5.

As distinct from conventional Floating Point Units the invention provides a leading zero logic 7 which computes the number of leading zeros of the fraction fb of the addend operand.

The output of the leading zero logic 7 and the shift amount logic 2 is fed in a compare logic 8 which based on the number of leading zeros and the alignment shift amount computes select signals that indicate whether the most significant bits of the alignment logic 3 output have all the same value in order to control the carry logic of the adder logic 5 and to control a stage of the normalization logic 6.

The adder logic 5 is divided in an adder unit 51 and an incrementer unit 52, wherein the output of the alignment logic 3 is divided in a lower part and a higher part. The lower part is added by the adder unit 51 to the product of the multiplier logic 4. The incrementer unit 52 adds a carry-out of the adder unit 51 to the higher part of the output of the alignment logic 3.

The adder logic 5 output sum is divided into a lower and a higher part, which higher part is computed by the incrementer unit 52 and which lower part is computed by the adder unit 51. The select signals of the compare logic 8 indicate whether all bits of the higher part of the alignment logic 3 output have the same value and are used to shift out the higher part of the adder logic output in the normalization shifter 6.

A carry output of the adder logic 5 is computed using the select signals of the compare logic 8 and the carry output of the adder unit 51, which comprises an end-around-carry logic which is activated by the select signals of the compare logic 8.

In summary the described invention uses a leading-zero counter 7 on the input fraction fb of the addend (before it gets aligned to the product in the first alignment-shifter). By then comparing that number of leading zeros against the alignment shift amount it is possible to detect whether the aligned addend has any '1's sticking out to the left of the lower part into the higher part. If this is not the case, it is known upfront that the incrementer input is all zeros, or if the operation is a subtraction (which we care about) whether the inverted alignment-shifted fraction is all '1's. In this case a carry-out of the adder will inherently propagate through the incrementer unit 52 and therefore back into the end-around-carry input of the adder unit 51. Therefore, this early detected all '1's situation can be used by short-cutting the end-around-carry directly from the adder-output into the adder-input. There is no need to go through the incrementer unit 52 for computing the end-around-carry-input. Also the outcome of the comparison is fed into the normalization shifter which can be configured early to take or not to take the higher part into account for the normalized output (this corresponds to the first normalization shift stage).

Benefits of the Invention Over the Prior Art are:

1) The incrementer carry-out is removed from the critical path through the end-around-carry-input of the adder unit 51.

2) It is known upfront in the Floating Point Unit pipeline that the incrementer unit 52 contains no significant digits, such that the normalization shifter logic 6 can already be configured very early to shift-away the incrementer part during the normalization. This removes the all-1 detection on the incrementer unit from the critical path for the normalization shift amount.

3) By decoupling the incrementer unit 52 from the adder unit 51, this allows a more flexible placement of those components in the Floating Point Unit floorplan of the chip surface. For example, it is now possible to place the incrementer unit relatively far away from the "hot" area where the adder unit resides.

The described method works, because using the leading-zero counter and comparing it to the shift-amount of the aligner provides the information of whether non-0 bits are sticking into the incrementer field very early in the pipeline, even before the alignment-shift has started. From that information it can be derived whether the incrementer field is all '0' (i.e. during subtraction the inverted incrementer field is all-1); if it is, any carry-out of the adder will directly propagate through the incrementer and back into the EAC adder. If the incrementer field contains a '1' (i.e. the inverted incrementer field contains a '0') no carry from the adder will propagate through the incrementer, which is the same as disabling the end-around-carry. Also the all-zero information obtained from comparing the alignment-shift-amount against the leading-zero-count is the same as the incrementer-all0/all1 detection, but is available much earlier.

One of the benefits are that the end-around-carry-path is reduced in its length from about 159 bits to about 106 bits, which significantly speeds up the end-around-carry adder due to less logic delay and less wire delay. Also the normalization shifter can be configured earlier, such that the delay of the select-line of the first shifter-stage can be reduced. Together this saves the delay of 4-6 logic gates.

Commercial Applicability:

The invention is commercially applicable particularly in the field of production, test and the operation of integrated chips in a wide field of applications in integrated chip technology since speeding up calculations is a needed technique.

What is claimed is:

1. A method for processing a fused multiple add instruction in a floating point unit in a data processing system with denormal multiplicand and addend operands having one addend operand and two multiplicand operands, the floating point unit comprising shift amount logic, alignment logic, multiply logic, adder logic and normalization logic, an alignment shift amount based on the exponents of the operands being computed by the shift amount logic, a fraction of the addend operand being aligned according to the alignment shift amount by an alignment logic, fractions of the multiplicand operands being multiplied by the multiply logic; outputs of the alignment logic and the multiply logic being added by the adder logic; an output of the adder logic being normalized by the normalization logic, the method comprising the steps of:

calculating a number of leading zeros of the fraction of the addend operand by leading zero logic;

computing select signals by compare logic based on the number of leading zeros and the alignment shift amount, which select signals indicate whether most significant bits of the alignment logic output have all the same value in order to control the carry logic of the adder logic and control a stage of the normalization logic;

dividing the output of the alignment logic into a lower part and a higher part, the adder logic being divided in an adder unit and an incrementer unit, the lower part being added by the adder unit to the product of the multiplier logic, the incrementer unit adding a carry-out of the adder unit to the higher part of the output of the alignment logic, the adder unit comprises an end-around-carry logic, the end-around-carry logic being activated by the select signals of the compare logic, the adder logic output being divided into a lower and a higher part, the higher part being computed by the incrementer unit and the lower part being computed by the adder unit and the select signals of the compare logic being used to shift out the higher part of the adder logic output in the normalization logic;

indicating by the select signals of the compare logic whether all bits of the higher part of the alignment logic output have the same value; and computing the carry output of the adder logic using the select signals of the compare logic and the carry output of the adder unit.

* * * * *